March 16, 1965  B. R. MENNESSON  3,173,528
CENTRIFUGAL CLUTCHES, IN PARTICULAR FOR LIGHT VEHICLES
SUCH AS BICYCLES PROVIDED WITH AN AUXILIARY ENGINE
Filed June 5, 1961  4 Sheets-Sheet 1
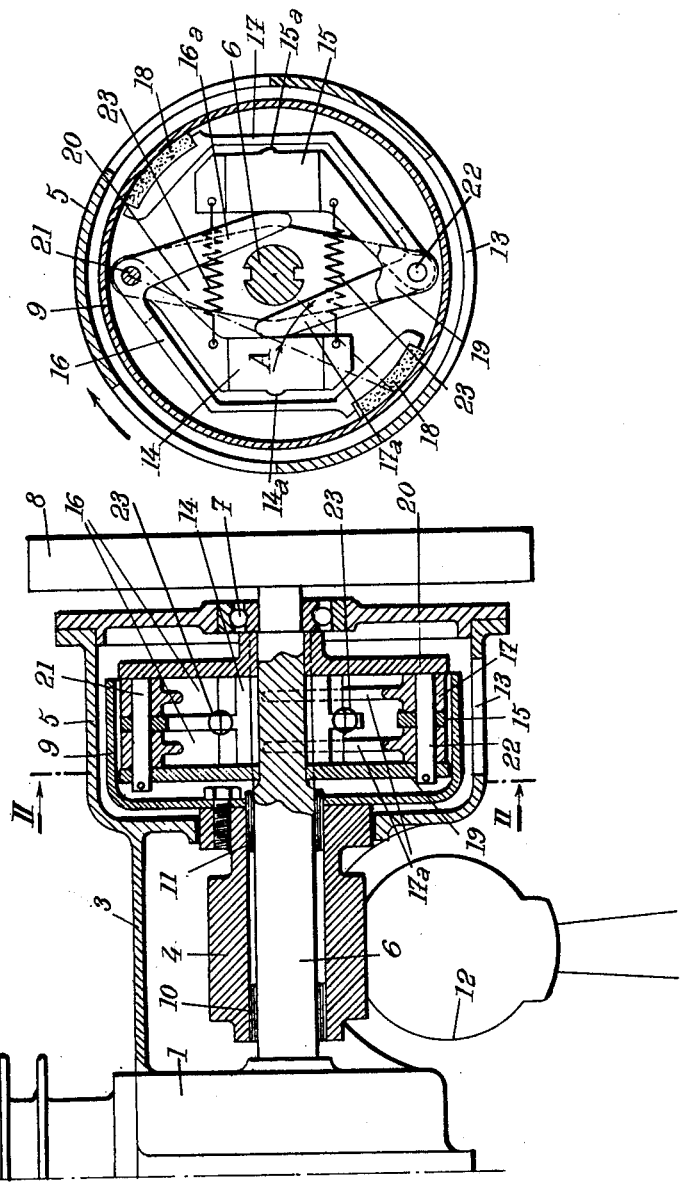
INVENTOR
BERNARD RENÉ MENNESSON
BY
Bailey, Stephens & Huettig
ATTORNEYS

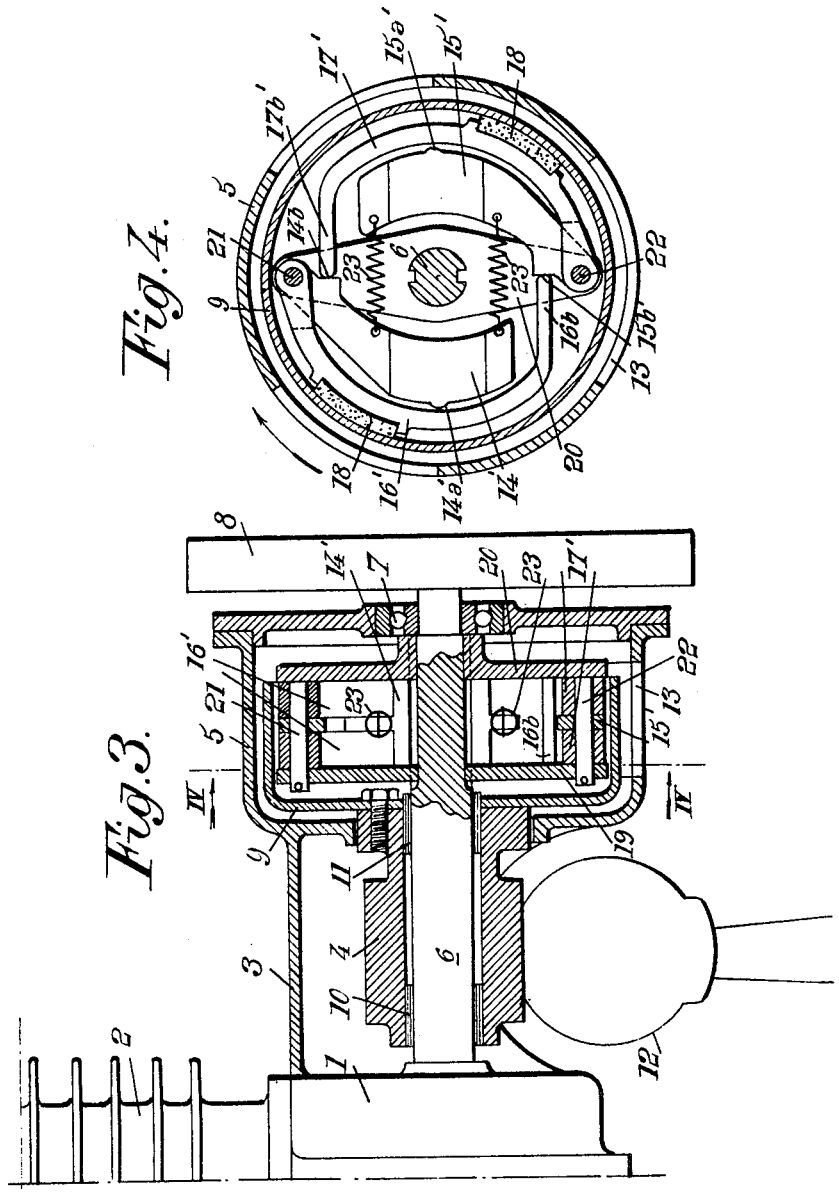

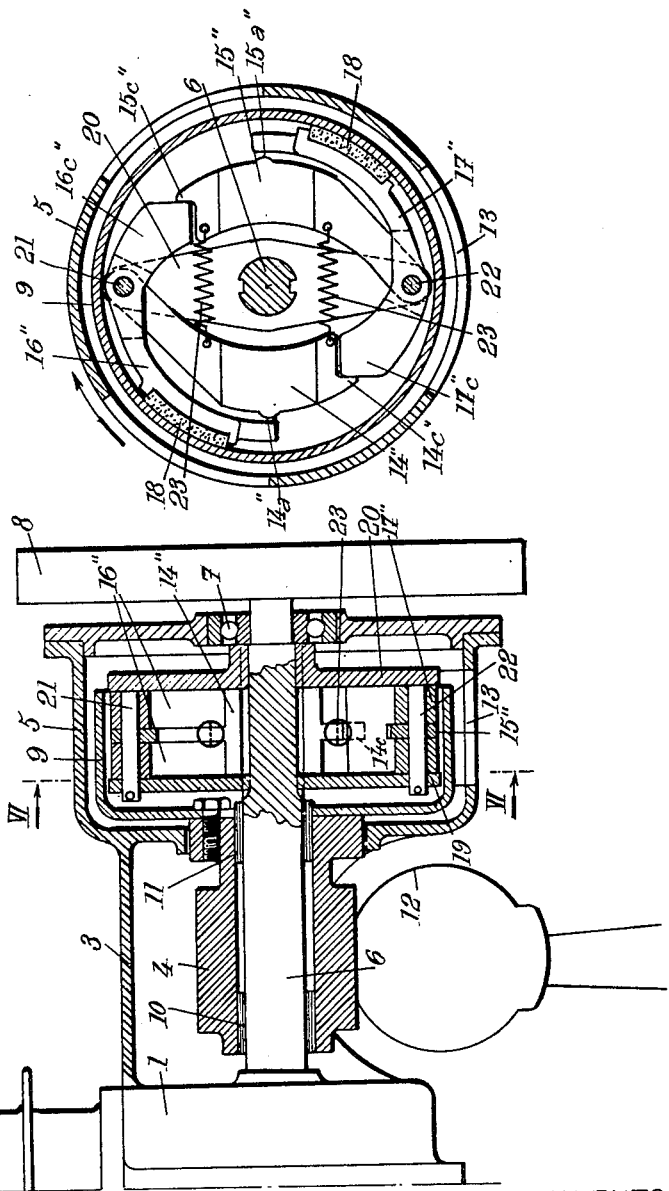

March 16, 1965 B. R. MENNESSON 3,173,528
CENTRIFUGAL CLUTCHES, IN PARTICULAR FOR LIGHT VEHICLES
SUCH AS BICYCLES PROVIDED WITH AN AUXILIARY ENGINE
Filed June 5, 1961 4 Sheets-Sheet 4

INVENTOR
Bernard René Mennesson
BY
Bailey, Stephens & Huettig
ATTORNEYS

United States Patent Office 3,173,528
Patented Mar. 16, 1965

3,173,528
CENTRIFUGAL CLUTCHES, IN PARTICULAR FOR LIGHT VEHICLES SUCH AS BICYCLES PROVIDED WITH AN AUXILIARY ENGINE
Bernard René Mennesson, Neuilly-sur-Seine, France, assignor to Societe d'Appareils de Controle et d'Equipement des Moteurs S.A.C.E.M., Neuilly-sur-Seine, France, a society of France
Filed June 5, 1961, Ser. No. 114,902
Claims priority, application France, Apr. 3, 1958, 762,308; Oct. 6, 1959, 806,846
10 Claims. (Cl. 192—103)

The present invention relates to centrifugal clutches for coupling a driven shaft and a driving shaft, these clutches comprising a drum rigid with one of these shafts and two clutch units including each a centrifugal weight movably mounted on the other shaft and capable, when moved centrifugally against the action of resilient means, of applying against the cylindrical wall of said drum a friction member carried by a support movably mounted on said other shaft.

The object of the present invention is to provide a clutch of this kind which is better adapted to meet the requirements of practice than those known up to this time and in particular which is well adapted for use on light vehicles such as bicycles provided with an auxiliary engine.

For this purpose, according to the invention, means are provided for operatively connecting the friction member support of each of said units with the centrifugal weight of the other unit to rotate said last mentioned support in the direction which applies its friction member against said drum in response to centrifugal movement of said last mentioned centrifugal weight by said resilient means, each of said centrifugal weights being movable freely with respect to both of said supports.

Other features of the present invention will become apparent in the course of the following detailed description of some embodiments thereof, with reference to the appended drawings given merely by way of example and in which:

FIG. 1 is a diagrammatic axial sectional view of a clutch made according to a first embodiment of the invention.

FIG. 2 is a section on the line II—II of FIG. 1.

FIGS. 3 and 4 are views, similar to FIGS. 1 and 2 respectively, showing another embodiment of the invention.

FIGS. 5 and 6 are views, similar to FIGS. 1 and 2 respectively, showing a third embodiment of the clutch according to the present invention.

Figure 8:
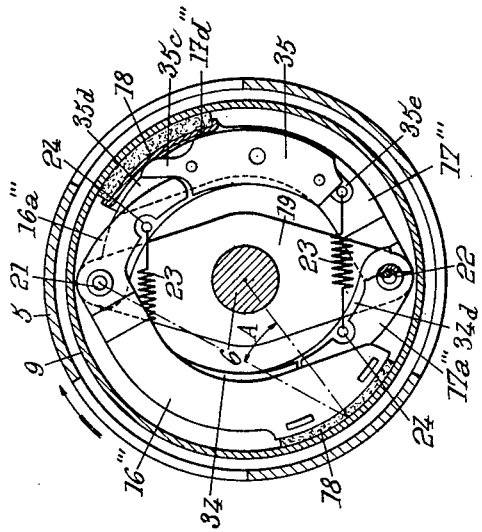
FIGS. 7 and 8 are views similar to FIGS. 1 and 2 respectively, showing a fourth embodiment of the clutch according to the present invention.

In the following description, it will be supposed that the invention is applied to the case of a centrifugal clutch to be mounted on an engine for driving a bicycle wheel through a roller.

In the modifications of FIGURES 3 and 4, 5 and 6, and 7 and 8 respectively corresponding parts carry the same reference numerals as in FIGURES 1 and 2 with additional prime designations, and in the description of operation it is to be understood that reference is made accordingly to these figures.

The internal combustion engine 1, together with its cylinder 2, is carried laterally by a protection casing 3 surrounding the driving roller 4 over a portion of its periphery. This casing carries, on the side thereof opposed to the engine, a housing 5 intended to contain the automatic clutch. The driving shaft 6 extends through casing 3 and housing 5, and it is supported at the outer end by a bearing 7 adjacent to the fly-wheel 8 of the engine. On the inside of housing 5, there is disposed a drum 9 having a cylindrical wall, this drum being rigid with the driving roller 4 which rotates freely on shaft 6 with the interposition of bearings 10 and 11. The tire of the bicycle wheel is shown at 12 and is in contact with roller 4 through which it is driven. Housing 5 is provided with apertures 13 for the circulation of air.

The clutch to be interposed between the driving shaft 6 and drum 9, which constitutes what may be considered as the driven shaft, includes two centrifugal weights, designated by reference numbers 14 and 15 (indicated by reference numerals 34 and 35 in FIGS. 7 and 8) adapted to cooperate with two supports 16 and 17 each carrying a friction member 18. Said weights 14 and 15 (34 and 35 in FIGURES 7 and 8) and said supports 16 and 17 are pivoted on two plates 19 and 20 rigid with shaft 6. In the constructions of FIGS. 1 to 6, centrifugal weight 14 and support 16 are pivoted about a common axis 21 and centrifugal weight 15 and support 17 about a common axis 22. The centrifugal weights are urged in the centripetal direction by springs 23.

Now, according to the present invention, as illustrated by FIGS. 1–6, these centrifugal weights 14 and 15 are arranged in such manner that, for all speeds lower than a first limit, they are caused, by springs 23, to act upon the extensions 17a, 16a respectively, of the supports 17, 16 of the other group so as to apply the friction members 18 of said supports against drum 9. For such speed conditions, as shown by FIGS. 1–6 inclusive, centrifugal weight 14 is located with a slight play between a boss 14a thereof and support 16 and centrifugal weight 15 is similarly located with a slight play between a boss 15a thereof and support 17.

Above said first limit, and up to a second given limit, centrifugal force moves weights 15 and 14 to such an extent that they no longer press against extensions 16a, 17a, respectively, so that the clutch is disengaged.

Such a clutch arrangement couples shaft 6 and drum 9 together for any speed of shaft 6 higher than the second given limit, which is higher than the first limit, due to the fact that, in this case, the centrifugal force exerted by weights 14 and 15 is sufficient to overcome the resistance of springs 23 and to apply weights 14 and 15 strongly, through their bosses 14a and 15a, against supports 16 and 17, respectively.

Springs 23 might be fixed at one end to one of the centrifugal weights 14, 15 and at the other end to a part rigid with shaft 6, but it seems more advantageous to have the respective ends of said springs fixed to the centrifugal weights 14 and 15, as shown by the drawings.

In the embodiment illustrated by FIGS. 1 and 2, said extension of support 16 (or 17) is constituted by an arm 16a (or 17a) making with the corresponding support an angle inside which shaft 6 is located and at the apex of which the pivot axis 21 (or 22) is located, this arm 16a (or 17a) being adapted to come into contact with centrifugal weight 15 (or 14) on the portion thereof that is located opposite shaft 6.

In the embodiment of FIGS. 3 and 4, the extension of support 16' (or 17') is constituted by an arm 16b' (or 17b') located at the end of this support that is opposed to the pivot axis 21 (or 22).

The force with which springs 23 apply friction members 18 upon drum 9 when shaft 6 is stopped depends upon the adjustment of these springs and upon the relative values of the lever arms that are used.

According to a first embodiment, the force exerted by springs 23 is insufficient to produce a coupling of shaft 6 with drum 9 by mere friction. In this case, the shape of the centrifugal weights 14 and 15 and the positioning of friction members 18 are arranged in such manner that driving shaft 6 is driven by drum 9 by wedging of friction members 18 against drum 9 when, the engine being stopped, the receiving drum 9 is driven by a displacement of the vehicle for instance.

For this purpose, as shown by FIG. 2, the pivot axes 21 and 22 are located ahead of friction members 18 with reference to the direction of rotation of shaft 6 (as indicated by an arrow) and the angle A made by the plane passing through pivot axis 21 (22) of each support 16 (17) and the area of friction of the friction member 18 with the drum 9, with the plane passing through the axis of shaft 6 and this same area, is given a value at most equal to the angle of friction of the friction members upon the drum, this angle A ranging from 20° to 30° in most cases.

According to a second embodiment, illustrated by FIGS. 3 and 4, the force exerted by springs 23 is sufficient to produce a coupling by mere friction and for this purpose arms 17b' (16b') are made to bear upon centrifugal weights 14' and (15') as close as possible to the pivot axis thereof, for instance through bosses 14b' (15b').

According to another feature of the present invention, supports are balanced about their respective axes 21 and 22 in such manner that the centrifugal force acting upon these supports tends to move them away from drum 9.

Such an arrangement is shown by FIGS. 5 and 6. This embodiment is similar to that of FIGS. 1 and 2 in that the extensions 16c'' and 17c'' of the centrifugal weights are located beyond the pivot axes 21 and 22 with respect to the remainder of said weights. This construction is also similar to that of FIGS. 3 and 4 in that the force exerted by springs 23 is sufficient to produce coupling of the shaft by mere friction. In this case, the extensions 16c'' and 17c'' of the supports 16 and 17 are given weights such that, between certain speeds, under the effect of the centrifugal force, the friction members 18 are moved away from the inner wall of the drum 9. With such an arrangement, these extensions cooperate with projections 14c'' (15c'') provided on centrifugal weights 14 (15).

The clutch according to my invention, as illustrated by FIGS. 1-6 works as follows:

When the engine is stopped, springs 23 keep centrifugal weights 14 and 15 applied, respectively, against extensions of supports 17 and 16 (in FIGS. 1 and 2, weights 14 and 15 bear upon arms 17a and 16a respectively of supports 17 and 16, respectively. In FIGS. 3 and 4, weights 14' and 15' bear, through projections 14b' and 15b', upon the ends 17b' and 16b', respectively, of said supports 17' and 16'. In FIGS. 5 and 6, projections 14c'' and 15c'' of weights 14'' and 15'' cooperate with the ends 17c'' and 16c'', respectively, of supports 17'' and 16''). If the driver then causes the vehicle to move forward, thus imparting a rotary movement to drum 9 in the direction of the arrows (FIGS. 2, 4 and 6), shaft 6 is driven by said drum, either both by friction and wedging (FIG. 2), or merely by friction (FIGS. 4 and 6). The engine thus started runs at idling speed. Centrifugal weights 14 and 15 then occupy their intermediate position. In FIGS. 1 and 2, weight 14, for instance, is in contact neither with support 16 nor with the extension 17a of support 17. In the embodiment of FIGS. 3 and 4, weight 14' is in contact neither with support 16' nor with the end 17b' of support 17'. In the embodiment of FIGS. 5 and 6, weight 14'' is in contact neither with support 16'' of support 17''. Furthermore, in the construction of FIGS. 5 and 6, the supports 16 and 17 are urged in the centripetal direction by the centrifugal force, due to their particular balancing, so that there is no friction in the clutch.

When the driver wishes to couple shaft 6 and drum 9 together, he increases the speed of the engine up to a value such that centrifugal weights 14 and 15 overcome the resistance of springs 23 and push supports 16 and 17 outwardly, so as to apply friction members 18 upon the drum.

Figure 7:
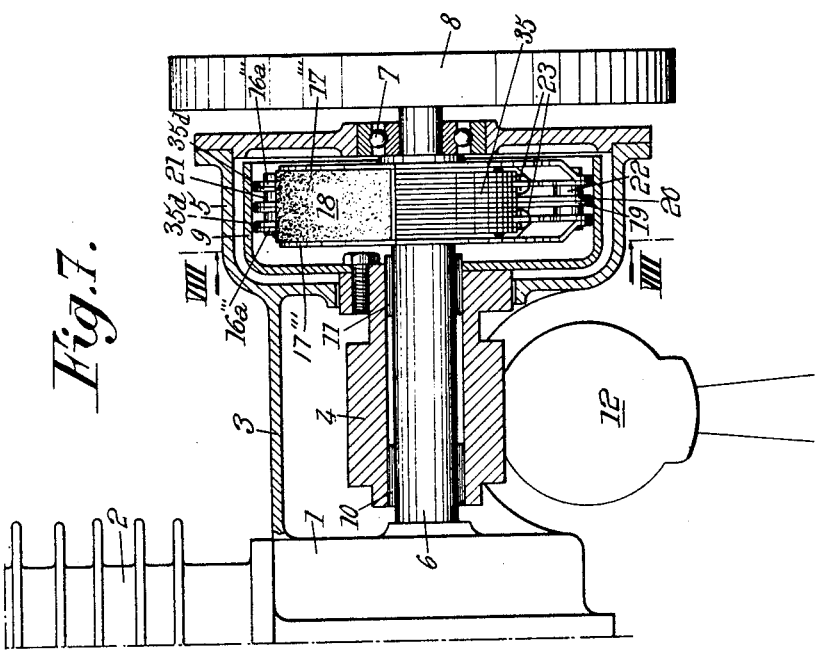

The embodiment of my invention illustrated by FIGS. 7 and 8 is similar to that of FIGS. 1 and 2 with the exception that the centrifugal weights are differently arranged.

In FIGS. 1 and 2, the centrifugal weight of each of the two clutch units is pivoted on the same pivot axis as the friction member support of the same clutch unit. Thus, in the first clutch unit, comprising centrifugal weight 14 and friction member support 16, this centrifugal weight 14 is pivoted about the same pivot axis 21 as this support 16. Likewise, in the second clutch unit, centrifugal weight 15 and friction member support 17 are both pivoted about the same pivot axis 22. This arrangement is also used in FIGS. 3-4 and 5-6.

In the construction of FIGS. 7 and 8, the centrifugal weights, designated by 34 and 35, are differently mounted. The centrifugal weight 34 of one clutch unit is pivoted about the same pivot axis 22 as the support 17''' of the friction member 18 of the other clutch unit. And the centrifugal weight 35 of said other clutch unit is pivoted about the same pivot axis 21 as the support 16''' of the friction member 18 of the first mentioned clutch unit.

In this embodiment of the invention, each friction member 18 is carried by a support comprising a pair of side plates (17''' for one of said friction members and 16''' for the other friction member) connected together by a metal sheet forming a base sent to accommodate said friction member 18. This base is shown at 17d''' for the support 17''' visible on the right hand side of FIG. 8.

Each of the centrifugal weights 34 and 35 is formed by a juxtaposition of metal sheets. Two of the sheets of juxtaposition 34, designated by reference numeral 34d, form extensions journalled on pivot axis 22. Similarly two of the sheets of the other juxtaposition 35, designated by reference numeral 35d, form extensions journalled on pivot axis 21. The other sheets of each of these centrifugal weights 34 and 35 form projections such as shown at 35c for centrifugal weight 35. This projection 35c bears both against the base 17d''' of support 17''' against the extension 16a''' of the other support 16b'''. The similar projection (not visible on the drawing) formed by centrifugal weight bears both against support 16b''' and against an extension 17a''' of support 17b'''.

Each of the springs 23 is secured at one end in a hole 24 provided in one of the extensions 34d (35d) of one of the centrifugal weights and at the other end in a hole provided in an extension 35e (34e) of a corresponding sheet of the other centrifugal weight. Each centrifugal weight, 34 or 35, is housed with a slight play between the side plates of the corresponding support, i.e., 16''' or 17''' respectively. The pairs of extensions 16a''' and 17a''' which are integral with side plates 16''' and 17''' respectively, are offset inwardly so that each of them can move freely between the side plates of the other support, 17''' and 16''' respectively.

The operation of this clutch is the same as that of the clutches shown by FIGS. 1 to 6. However it should be noted that since each of the centrifugal weights, for instance 35, is in contact, through a portion 35c thereof, both with the base 17d of one friction member support 17''' and with the extension 16a''' of the other support, the parts always remain in the relative positions shown by FIG. 8. But, according to the speed at which shaft 6 is driven, the action of the centrifugal weights is different. When this shaft is stationary, the centrifugal weights have no action and springs 23 strongly apply the centrifugal weights 34 and 35 against the extensions 17a''' and 16a''' of the supports, respectively. When the engine is idling, the action of the centrifugal weights approximately balances that of springs 23 so that the friction members 18 are slipping along drum 9 without being applied thereon with a pressure sufficient ito drive it. When the engine is running at sufficient speed, the centrifugal weights overcome the resistance of springs 23 and act on supports 16''' and 17''' to apply friction members 18 against drum 9 strongly enough to drive it.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

The present application is a coninuation-in-part of each of patent applications Ser. No. 801,172, filed March 23, 1959 and Ser. No. 60,629, filed October 5, 1960 (both now abandoned).

What I claim is:

1. A centrifugal clutch which comprises, in combination, a driving shaft, a driven cylindrical drum coaxial with said driving shaft, two clutch units each including a centrifugal weight pivoted to said driving shaft about a pivot axis parallel to the axis thereof, resilient means for urging said centrifugal weight in the centripetal direction, a support movable separately from said weight and pivoted to said driving shaft about an axis parallel to the axis thereof and a friction member carried by said support in a position to be brought into engagement with said drum when said support is pivoted in one direction, said support being mounted to cooperate with said centrifugal weight so as to be rotated by it in said direction when said centrifugal weight moves centrifugally against the action of said resilient means, and means for operatively connecting the support of each of said units with the centrifugal weight of the other unit to rotate said last mentioned support in said direction in response to centripetal movement of said last mentioned centrifugal weight by said resilient means, each of said centrifugal weights being movable freely with respect to both of said supports.

2. A clutch according to claim 1 in which the centrifugal weight and the friction member support of each of said units are both pivoted about the same axis to said driving shaft.

3. A clutch according to claim 1 in which the centrifugal weight of each of said units and the friction member support of the other of said units are both pivoted about the same axis to said driving shaft.

4. A centrifugal clutch which comprises, in combination, a driving shaft, a driven cylindrical drum coaxial with said driving shaft and surrounding a portion thereof, two clutch units each including a centrifugal weight pivoted to said driving shaft portion about a pivot axis parallel to the axis thereof and located inside said drum, resilient means for urging said centrifugal wegiht in the centripetal direction, a support movable separately from said weight and pivoted to said driving shaft about an axis parallel to the axis thereof and a friction member carried by said support in a position to be brought into engagement with said drum when said support is pivoted in one direction, said support being arranged to cooperate with said centrifugal weight so as to be pushed by it to rotate in said direction when said centrifugal weight moves centrifugally against the action of said resilient means, and an arm rigid with the support of each of said units and arranged to cooperate with the centrifugal port to rotate it in said direction in response to centripetal movement of said last mentioned centrifugal weight by said resilient means, each of said centrifugal weights being interposed between the support of its unit and the arm fixed to the other unit and being freely movable with respect to said last mentioned support and arm.

5. A clutch according to claim 4 in which each of said arms starts from the support with which it is rigid at a point thereof close to the point where said last mentioned support is pivoted to said driving shaft.

6. A clutch according to claim 4 in which each of said arms starts from the support with which it is rigid at a point thereof at the maximum distance from the point where said last mentioned support is pivoted to said driving shaft.

7. A clutch according to claim 5 in which said friction members are positioned on said supports respectively to wedge against said drum when their respective supports are urged outwardly by said centrifugal weights.

8. A clutch according to claim 4, in which the whole of each of said supports and of said arm rigid therewith is balanced about its axis of pivoting so that the centrifugal force tends to move said support away from said drum.

9. A clutch according to claim 3 in which each of said supports consists of two side plates and a bent metal sheet connecting said side plates together, the friction member carried by said support being fitted in said bent metal sheet.

10. A clutch according to claim 3 in which each of said centrifugal weights comprises a plurality of juxtaposed metal sheets two of which include extensions mounted on the pivot axis of said centrifugal weights.

References Cited in the file of this patent

UNITED STATES PATENTS

| 2,275,046 | Harris | Mar. 3, 1942 |
| 2,318,433 | Stechbart | May 4, 1943 |
| 2,355,710 | Dodge | Aug. 15, 1944 |

FOREIGN PATENTS

| 1,204,485 | France | Aug. 10, 1959 |
| 507,216 | Germany | Sept. 13, 1930 |
| 1,022,890 | Germany | Jan. 16, 1958 |